United States Patent
Tong et al.

(10) Patent No.: US 8,626,787 B1
(45) Date of Patent: *Jan. 7, 2014

(54) LOCATING MEANINGFUL STOPWORDS OR STOP-PHRASES IN KEYWORD-BASED RETRIEVAL SYSTEMS

(71) Applicant: Google Inc., Mountain View, CA (US)

(72) Inventors: Simon Tong, Mountain View, CA (US); Uri Lerner, Mountain View, CA (US); Amit Singhal, Palo Alto, CA (US); Paul Haahr, San Francisco, CA (US); Steven Baker, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,968

(22) Filed: Jun. 20, 2013

Related U.S. Application Data

(63) Continuation of application No. 13/485,605, filed on May 31, 2012, now Pat. No. 8,473,510, which is a continuation of application No. 13/098,956, filed on May 2, 2011, now Pat. No. 8,214,385, which is a continuation of application No. 12/185,651, filed on Aug. 4, 2008, now Pat. No. 7,945,579, which is a continuation of application No. 10/813,590, filed on Mar. 31, 2004, now Pat. No. 7,409,383.

(51) Int. Cl.
  *G06F 17/30* (2006.01)
  *G06F 7/00* (2006.01)
(52) U.S. Cl.
  USPC .......................... 707/769; 707/758; 707/803
(58) Field of Classification Search
  None
  See application file for complete search history.

(56) References Cited

U.S. PATENT DOCUMENTS

| | | | | |
|---|---|---|---|---|
| 6,360,215 B1* | 3/2002 | Judd et al. | | 707/3 |
| 6,477,524 B1* | 11/2002 | Taskiran et al. | | 707/2 |
| 6,804,662 B1* | 10/2004 | Annau et al. | | 707/2 |
| 7,039,631 B1* | 5/2006 | Finger, II | | 707/3 |
| 7,383,258 B2 | 6/2008 | Harik et al. | | |
| 7,409,383 B1 | 8/2008 | Tong et al. | | |
| 7,945,579 B1 | 5/2011 | Tong et al. | | |
| 8,214,385 B1 | 7/2012 | Tong et al. | | |
| 2003/0004914 A1* | 1/2003 | McGreevy | | 707/1 |
| 2003/0069877 A1* | 4/2003 | Grefenstette et al. | | 707/2 |

(Continued)

OTHER PUBLICATIONS

Chang et al.: Predicate Rewriting for Translating Boolean Queries in a Heterogeneous Information System, ACM Transactions on Information Systems, vol. 17, No. 1, Jan. 1999.*

(Continued)

*Primary Examiner* — Kuen Lu
(74) *Attorney, Agent, or Firm* — Harrity & Harrity, LLP

(57) ABSTRACT

A stopword detection component detects stopwords (also stop-phrases) in search queries input to keyword-based information retrieval systems. Potential stopwords are initially identified by comparing the terms in the search query to a list of known stopwords. Context data is then retrieved based on the search query and the identified stopwords. In one implementation, the context data includes documents retrieved from a document index. In another implementation, the context data includes categories relevant to the search query. Sets of retrieved context data are compared to one another to determine if they are substantially similar. If the sets of context data are substantially similar, this fact may be used to infer that the removal of the potential stopword(s) is not material to the search. If the sets of context data are not substantially similar, the potential stopword can be considered material to the search and should not be removed from the query.

20 Claims, 9 Drawing Sheets

(56) References Cited

U.S. PATENT DOCUMENTS

| | | | |
|---|---|---|---|
| 2003/0088562 A1* | 5/2003 | Dillon et al. | 707/5 |
| 2003/0115187 A1* | 6/2003 | Bode et al. | 707/3 |
| 2003/0233618 A1* | 12/2003 | Wan | 715/513 |
| 2004/0068697 A1* | 4/2004 | Harik et al. | 715/513 |
| 2004/0088308 A1* | 5/2004 | Bailey et al. | 707/100 |
| 2004/0215608 A1* | 10/2004 | Gourlay | 707/3 |

OTHER PUBLICATIONS

Co-pending U.S. Appl. No. 13/485,605, filed May 31, 2012, entitled "Locating Meaningful Stopwords or Stop-Phrases in Keyword-Based Retrieval Systems," Tong et al., 38 pages.

Chang et al., "Predicate Rewriting for Translating Boolean Queries in a Heterogeneous Information System," ACM Transactions on Information Systems, vol. 17, No. 1, Jan. 1999, pp. 1-39.

* cited by examiner

LOCATING MEANINGFUL STOPWORDS OR STOP-PHRASES IN KEYWORD-BASED RETRIEVAL SYSTEMS

RELATED APPLICATIONS

This application is a continuation of U.S. patent application Ser. No. 13/485,605, filed May 31, 2012; which is a continuation of U.S. patent application Ser. No. 13/098,956, filed May 2, 2011 (now U.S. Pat. No. 8,214,385); which is a continuation of U.S. patent application Ser. No. 12/185,651, filed Aug. 4, 2008 (now U.S. Pat. No. 7,945,579); which is a continuation of U.S. patent application Ser. No. 10/813,590, filed Mar. 31, 2004 (now U.S. Pat. No. 7,409,383). The disclosures of these applications are incorporated herein by reference in full.

BACKGROUND OF THE INVENTION

A. Field of the Invention

Systems and methods consistent with the principles of the present invention relate generally to information retrieval and, more particularly, to techniques for locating stopwords/stop-phrases.

B. Description of Related Art

Information retrieval systems (e.g., search engines) that use keyword-based queries typically ignore words ("stopwords") or groups of words ("stop-phrases") that occur very commonly and are usually unconnected to the information being sought. Typically, stopwords or stop-phrases appear in queries because users phrase their queries, even for keyword-based systems, as if they are intended for a human reader. For example, the word "a" in the query "a London hotel" is a stopword and the phrase "show me" in the query "show me London hotels" is a stop-phrase. Both "a" and "show me" are meaningless for the user's intent to find information about hotels in London.

Sometimes, however, stopwords and stop-phrases can be meaningful in a query. A search query "the matrix" is typically intended to find information relating to the movie "The Matrix," and not the mathematical concept of matrices. Similarly, the phrase "show me" in the context of the search queries "show me the money," "show me the way lyrics," or "show me state" all contain meaningful uses of the term "show me." The query "show me the way lyrics," for instance, is probably a request for lyrics to a song titled "Show Me the Way," such as the like titled songs by the musician Peter Frampton or the musical group Styx.

One technique for handling stopwords and stop-phrases uses a list of known stopwords and stop-phrases. Stopwords or stop-phrases that are on the list are stripped from search queries before giving the search query to the search engine. This simple technique can, however, potentially ignore meaningful stopwords and stop-phrases. One solution to this problem is to build a known list of exceptional phrases when looking for stopwords. Stopword policy may then be to not ignore stopwords or stop-phrases when the other terms from the phrase are present in a query. For example, such a list could include "the matrix" or "show me the money." This approach can also be problematic, however, as it can be difficult to identify phrases in which stopwords are meaningful and to maintain an up-to-date list of such stopwords and stop-phrases.

Accordingly, it would be desirable to more effectively determine when a stopword or stop-phrase is present in a query.

SUMMARY OF THE INVENTION

One aspect of the invention is directed to a method of detecting stopwords in a query. The method includes identifying a potential stopword in the query based on a comparison to a list of stopwords and generating sets of context data based on the query and the potential stopword. The method further includes comparing the sets of context data and classifying the potential stopword as an actual stopword or as terms material to the query based on the comparison.

A second aspect of the invention is directed to a method that includes identifying potential stopwords in a query and generating context data based on the query and the potential stopwords. The method further includes rewriting the query to remove those of the potential stopwords that did not substantially effect generation of the context data.

Yet another aspect of the invention is directed to a system comprising a parser component, a context generation component, and a comparator component. The parser component receives search queries and identifies potential stopwords in the search queries. The context generation component generates context data based on the search queries and the potential stopwords. The comparator component compares the context data to determine those of the potential stopwords that effect generation of the context data.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

Overview

As described herein, a stopword detection component determines when stopwords in a query are meaningful based on context developed for the query. The meaningful stopwords can then be included in the actual query submitted to the search engine instead of stripping them from the search query.

Figure 1:
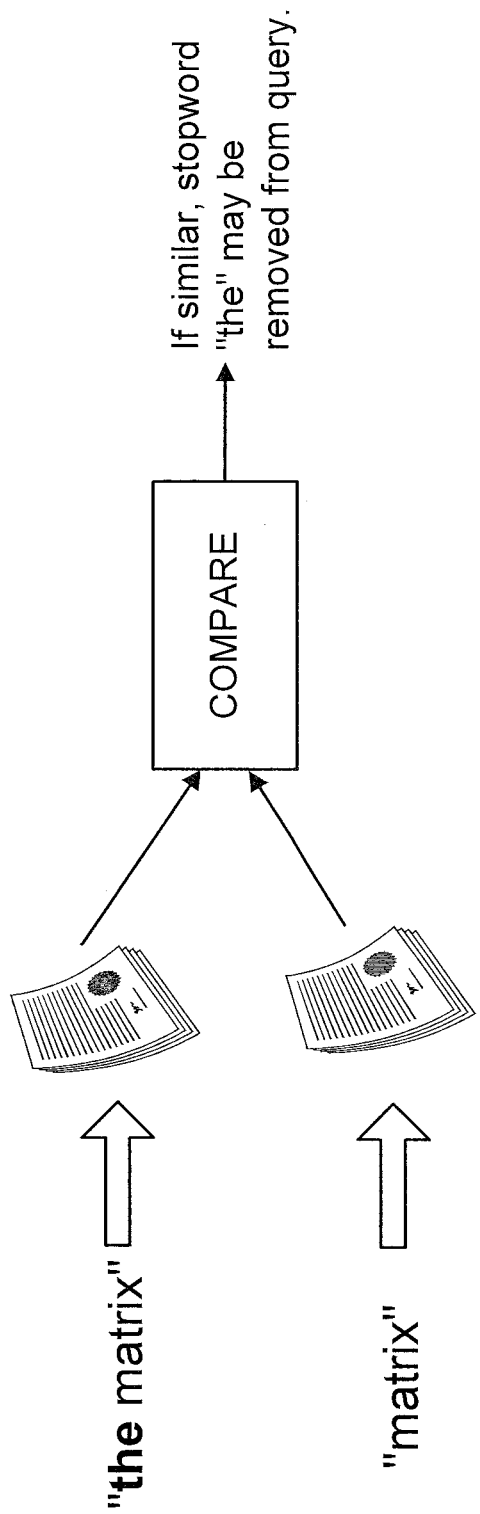
FIG. 1 is a diagram illustrating an exemplary overview of concepts consistent with aspects of the invention.

FIG. 1 is a diagram illustrating an exemplary overview of concepts consistent with aspects of the invention for determining whether a query includes words or phrases that should be considered as stopwords or stop-phrases. An initial exemplary query, "the matrix," is parsed and determined to contain a potential stopword "the." The potential stopword may be removed from the query to generate a second query "matrix." The first and second queries may then be used to generate corresponding first and second sets of context data. The context data may be obtained as results of a search engine or as lists of category names. These sets of context data may be compared to determine if they are substantially similar.

If the sets of data are substantially similar, this fact may be used to infer that the removal of the potential stopword(s) is not material to the search. The potential stopword can be considered a valid stopword in the context of the query. If the sets of data are not substantially similar, the potential stopword can be considered material to the search and should not be removed from the query. In this manner, stopword/stop-phrases are detected in the context of a complete search query.

Exemplary Network Overview

Figure 2:
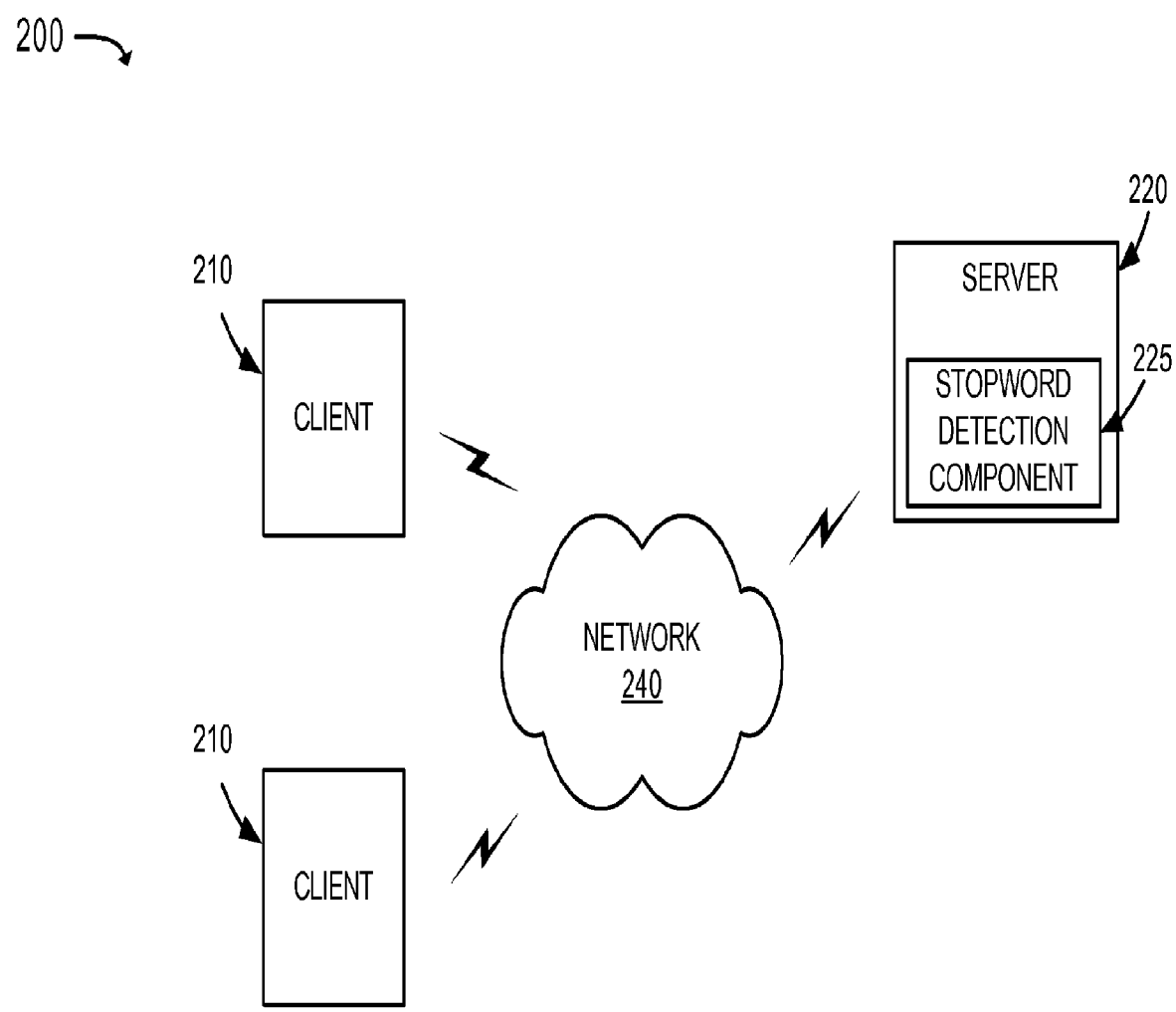
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

Clients 210 may be a number of different entities, such as wireless telephones, a personal computer, a personal digital assistant (PDA), a lap top, or another type of computation or communication device, a thread or process running on one of these devices, and/or an object executable by one of these devices. Server 220 may include components that process, search, and/or maintain documents in a manner consistent with the principles of the invention. Clients 210 and server 220 may connect to network 240 via wired, wireless, or optical connections.

In an implementation consistent with the principles of the invention, server 220 may implement a search engine usable by clients 210. In general, in response to a client search query, the search engine returns resources, such as web pages, to the client. The search query may be modified to remove certain stopwords/stop-phrases determined by stopword detection component 225. The stopwords/stop-phrases may be determined based on the context of the full search query.

A document, as the term is used herein, is to be broadly interpreted to include any machine-readable and machine-storable work product. A document may be an e-mail, a blog, a file, a combination of files, one or more files with embedded links to other files, a news group posting, etc. In the context of the Internet, a common document is a web page. Web pages often include content and may include embedded information (such as meta information, hyperlinks, etc.) and/or embedded instructions (such as Javascript, etc.).

Exemplary Client/Server Architecture

Figure 3:
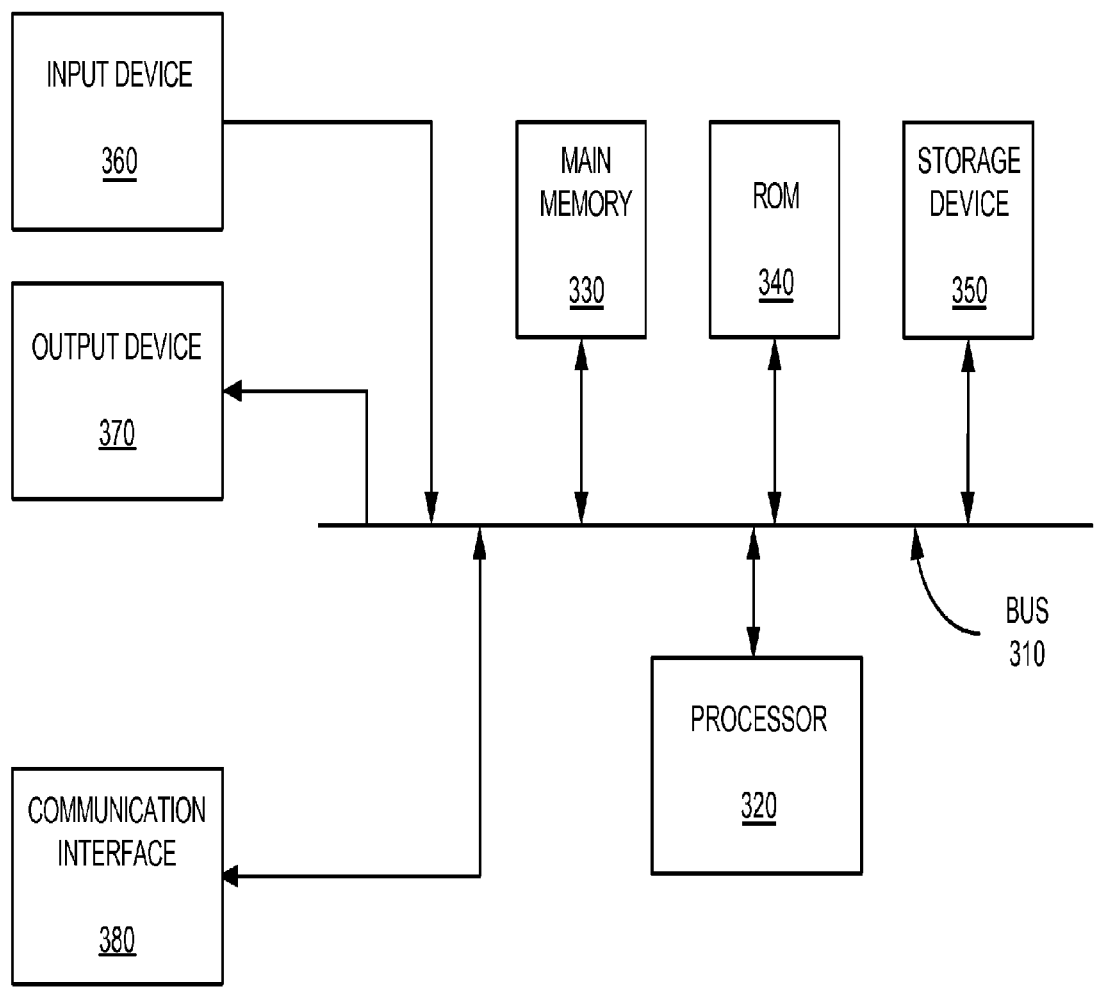
FIG. 3 is an exemplary diagram of a client or server according to an implementation consistent with the principles of the invention.

FIG. 3 is an exemplary diagram of a client 210 or server 220 according to an implementation consistent with the principles of the invention. Client/server 210/220 may include a bus 310, a processor 320, a main memory 330, a read only memory (ROM) 340, a storage device 350, an input device 360, an output device 370, and a communication interface 380. Bus 310 may include a conductor that permits communication among the components of client/server 210/220.

Processor 320 may include a conventional processors or microprocessor that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits a user to input information to client/server 210/220, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220, consistent with the principles of the invention, may implement stopword detection component 225. Stopword detection component 225 may be stored in a computer-readable medium, such as memory 330. A computer-readable medium may be defined as one or more physical or logical memory devices and/or carrier waves.

The software instructions defining stopword detection component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of or in combination with software instructions to implement processes consistent with the present invention. Thus, implementations consistent with the principles of the invention are not limited to any specific combination of hardware circuitry and software.

Stopword Detection Component 225

Figure 4:
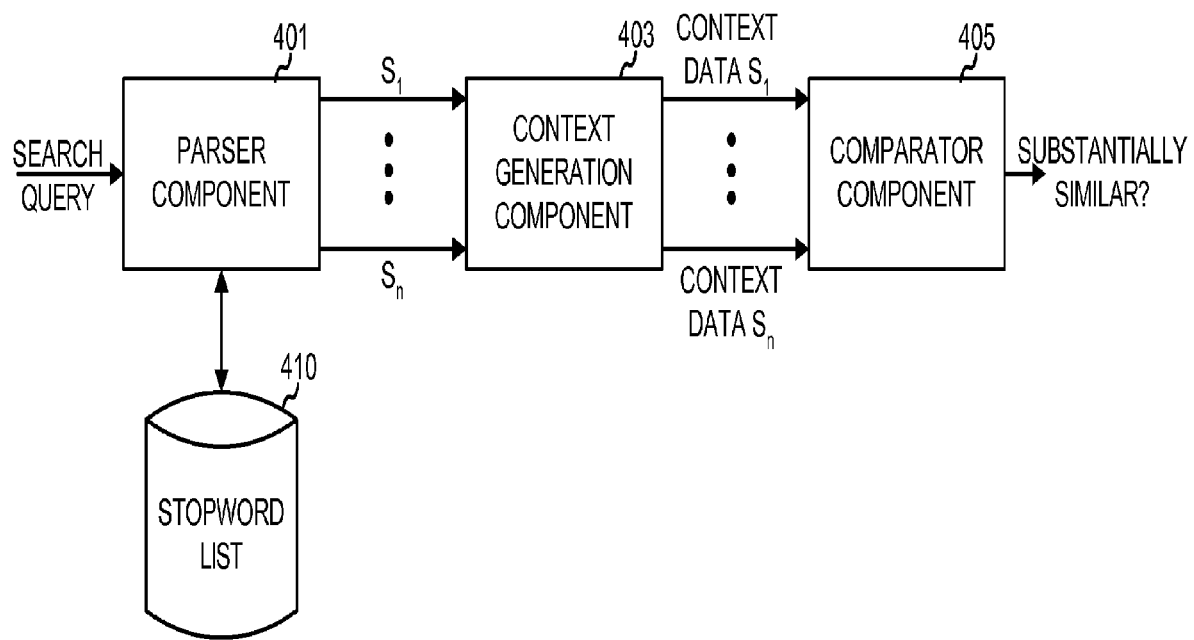
FIG. 4 is a block diagram conceptually illustrating an implementation of the stopword detection component shown in FIG. 2.

FIG. 4 is a block diagram conceptually illustrating an implementation of stopword detection component 225. Stopword detection component 225 may include parser component 401, context generation component 403, and comparator component 405. Additionally, stopword detection component 225 may include a stopword list 410. Stopword list 410 may include a list of potential stopwords and stop-phrases (e.g., "the", "a", "show me", etc.). The list may be pre-generated in a number of ways, such as by manually compiling list 410 and/or through automated techniques. Automatic techniques for compiling list 410 may, for example, be based on the inverse document frequency (IDF) of terms or phrases. The IDF is a measure of term frequency in which more common words have lower IDF values. Stopwords/stop-phrases typically have low IDF values. In general, the list includes terms or phrases that, when used in a search query, are frequently terms/phrases that are unconnected to the user's intended information results.

List 410 may be implemented in many different forms, such as a distributed database, a relational database, a simple file structure, and so on. List 410, and the operation of stopword detection component 225, will, for notational convenience, be described as containing/operating on stopwords, although stop-phrases can be equivalently implemented in list 410. Thus, henceforth, the term "stopword" can also be construed to refer to "stop-phrases."

Parser component 401 may receive user search queries and parse the search queries into a structure containing the individual terms from the search queries. The parsing may be performed by separating terms in a search query based on spaces or punctuation marks between terms. Parser component 401 may additional identify terms or phrases in the parsed search query as whether they are stopwords. This can be performed by matching the terms in the parsed search query to stopword list 410.

Context generation component 403 may receive the parsed search query from parser component 401 or receive multiple versions of the search query in which each version contains all of the non-stopwords from the query and various combinations of the stopwords. As shown in FIG. 4, a number of versions of the search query, $S_1$ through $S_n$, are input to context generation component 403. In one implementation, n is equal to two, and $S_1$ represents the original search query and $S_2$ represents the search query minus all of its stopwords.

Context generation component 403 may generate context data sets for the n queries S. In a first possible implementation, the context data includes documents returned from a search engine that uses the search queries to perform searches on an index of documents. In a second implementation, the context data includes lists of possible categories to which the search queries are likely to pertain.

Figure 5:
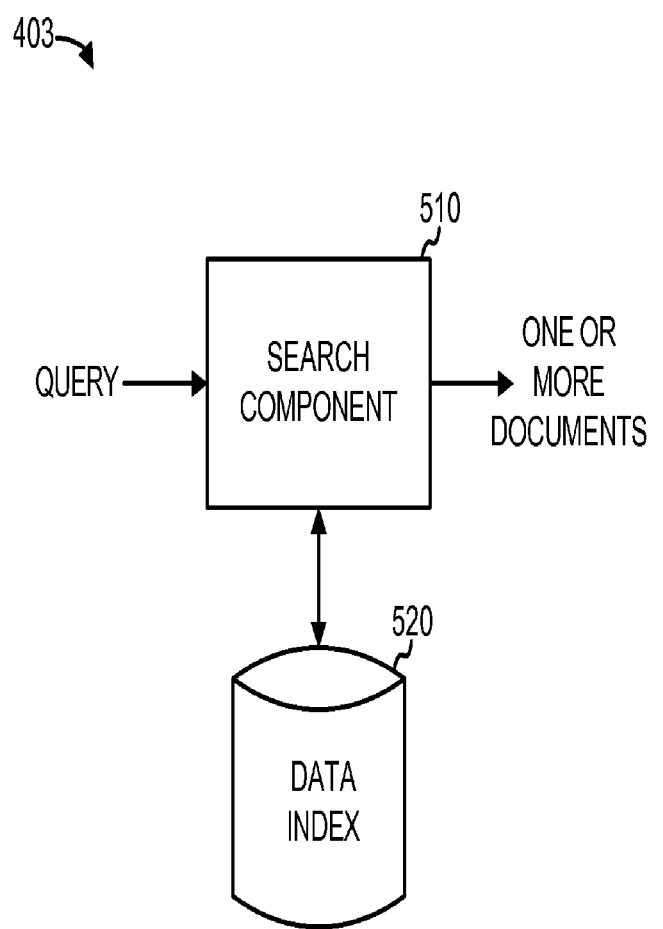
FIG. 5 is a diagram illustrating a first implementation of the context generation component shown in FIG. 4.

FIG. 5 is a diagram illustrating the first implementation of context generation component 403 in additional detail. In this implementation, context generation component 403 returns context data that includes documents returned from a search engine. Context generation component 403 may include a search component 510 and a document index 520. Document index 520 includes a pre-indexed corpus of documents, such as a large number of documents taken from a source, such as the World Wide Web. Other sources for the documents in document index 520 are, of course, possible. For example, document index 520 may be derived from a specialized collection of documents, such as news articles, or from a set of documents specifically selected to facilitate the operation of stopword detection component 225. In the situation in which document index 520 includes documents specifically selected to facilitate the operation of stopword detection component 225, each of the documents may be selected as being representative of an individual concept in which the words in each document are words that are related to the concept.

In operation, search component 510 receives search queries and returns documents (or links to documents) that are relevant to the search queries. Search component 510 may access document index 520 to locate documents relevant to the search query. Techniques for locating relevant documents from a document index based on a search query are well known in the art and will not be further described herein.

Figure 6:
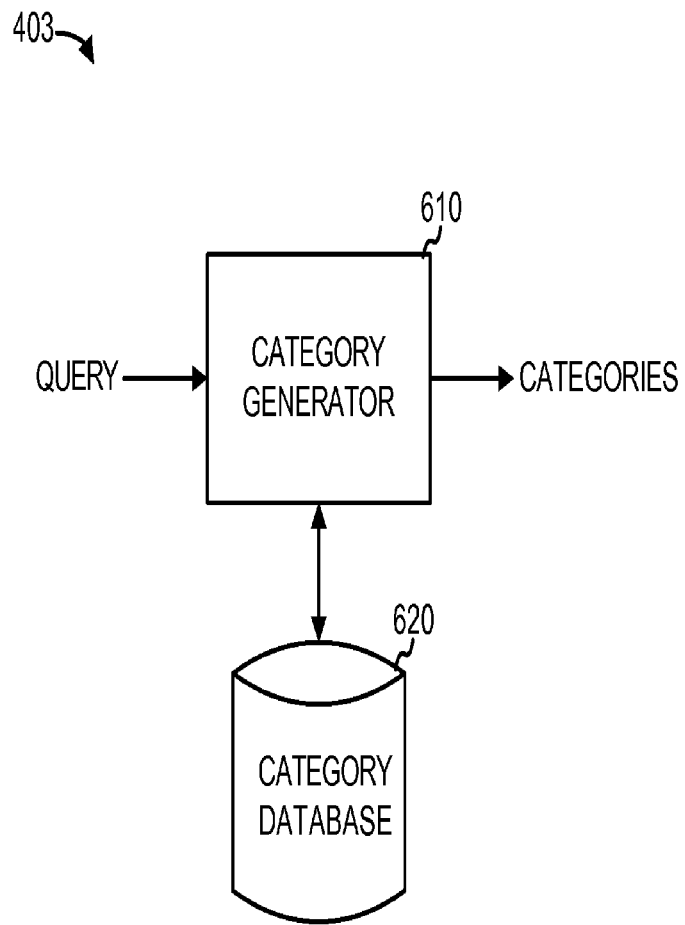
FIG. 6 is a diagram illustrating a second implementation of the context generation component shown in FIG. 4.

FIG. 6 is a diagram illustrating the second implementation of context generation component 403 in additional detail. In this implementation, context generation component 403 returns category names that are determined to be relevant to a search query. As shown, in this implementation, context generation component 403 may include a category generator 610 and a category database 620. Category database 620 may store a list of category titles along with descriptive information, such as textual information, that describes the category. Category generator 610 may compare the input search queries to the category titles and the category descriptive information to determine which of the categories are relevant to the search queries. Thus, in general, category generator 610 and category database 620 implement a taxonomy of categories that are constructed with words from documents related to the particular category. The category titles that are used to label each category may include titles, such as "arts>music>singers>Frank Sinatra" and "arts>music>singers>Peter Frampton."

In operation, category generator 610 may receive an input search query and return a list of the categories most relevant to the search query. In some implementations, each of the returned categories may also be associated with a score that defines a degree of relevance of the category to the search query.

The commonly assigned patent application "Method and Apparatus for Characterizing Documents Based on Clusters of Related Words," application Ser. No. 10/676,571, filed Sep. 30, 2003, describes, in additional detail, some techniques that may be applied to implement the functionality of category generator 610. The contents of this application are incorporated herein by reference. It will be readily apparent to those skilled in the art that numerous other techniques may be applied to implement the functionality of category generator 610; for purpose of clarity, such details have not been described in detail so as not to unnecessarily obscure the present invention.

Referring back to FIG. 4, comparator component 405 compares context data corresponding to multiple queries from context generation component 403. Based on the comparison, comparator component 405 determines whether the context data from multiple sets of documents are "substantially similar." Whether a set is substantially similar to another set can then be used by stopword detection component 225 to determine, as described in more detail below, whether to include or exclude the stopword from a final rewritten version fo the stopword.

Whether the two sets of context data are "substantially similar" can be determined by context component 405 using a number of possible techniques. When the context data includes sets of documents, such as sets of documents returned from search component 510, similarity can be determined by comparing word frequency in each set of documents. For example, frequently occurring words can be compared from both sets of documents. If the frequencies are relatively equal, the sets of documents can be said to be substantially similar. Other techniques for determining substantial similarity, such as by simply looking at the percentage of documents appear in the two sets of context data, could alternatively be used.

When the context data includes lists of categories, such as categories returned from category generator 610, "substantially similar" can be determined by directly comparing categories. For example, two sets of category lists can be compared by calculating the portion of the categories that are in both sets. That is, the number of categories in common between the two sets may be divided by the total number of different categories in the two sets to obtain a similarity metric.

Other techniques, such as those based on the relevance scores returned with each category, could alternatively be used. More specifically, the similarity metric mentioned in the previous paragraph may be calculated as a weighted metric based on the category relevance scores. For example, the relevance scores associated with each of the categories in common between the two sets may be summed and then divided by the sum of all the relevance scores of the different categories in the two sets. Alternatively, the relevance scores between the two sets can be normalized such that the sum for each set, or the sum of squares for each set, is one. The products of the relevance scores of matching categories may then be summed to obtain a similarity metric. A further modification in calculating this similarity metric may be based on additional similarity scores that define similarity between different categories. For example, there may be two categories that are both about slightly different types of cartoons, and the relatedness of these two categories may be defined with a category similarity score. In this situation, the similarity metric may then be calculated based on comparing every pair of categories associated with two queries, computing their similarity scores to each other, multiplying by the relevance scores, adding these values, and then normalizing by dividing by the sum of the relevance scores of the different categories in the two sets.

Still another technique that may be used to determine similarity between categories may be based on the observation that some categories add little value to the query context analysis. These categories may be ignored. For example, one possible category may be triggered when the query is a question. Anytime a query has the words "where," "what," etc., this category may be associated with the query, even though this category is not really relevant to the real meaning of the query. Categories such as this may thus be pre-determined and ignored when they are returned from category generator 610.

One of ordinary skill in the art will recognize that, in addition to the techniques discussed above for determining similarity, other techniques for determining similarity are known in the art and could be used.

Operation of Stopword

Detection Component 225

Figure 7:
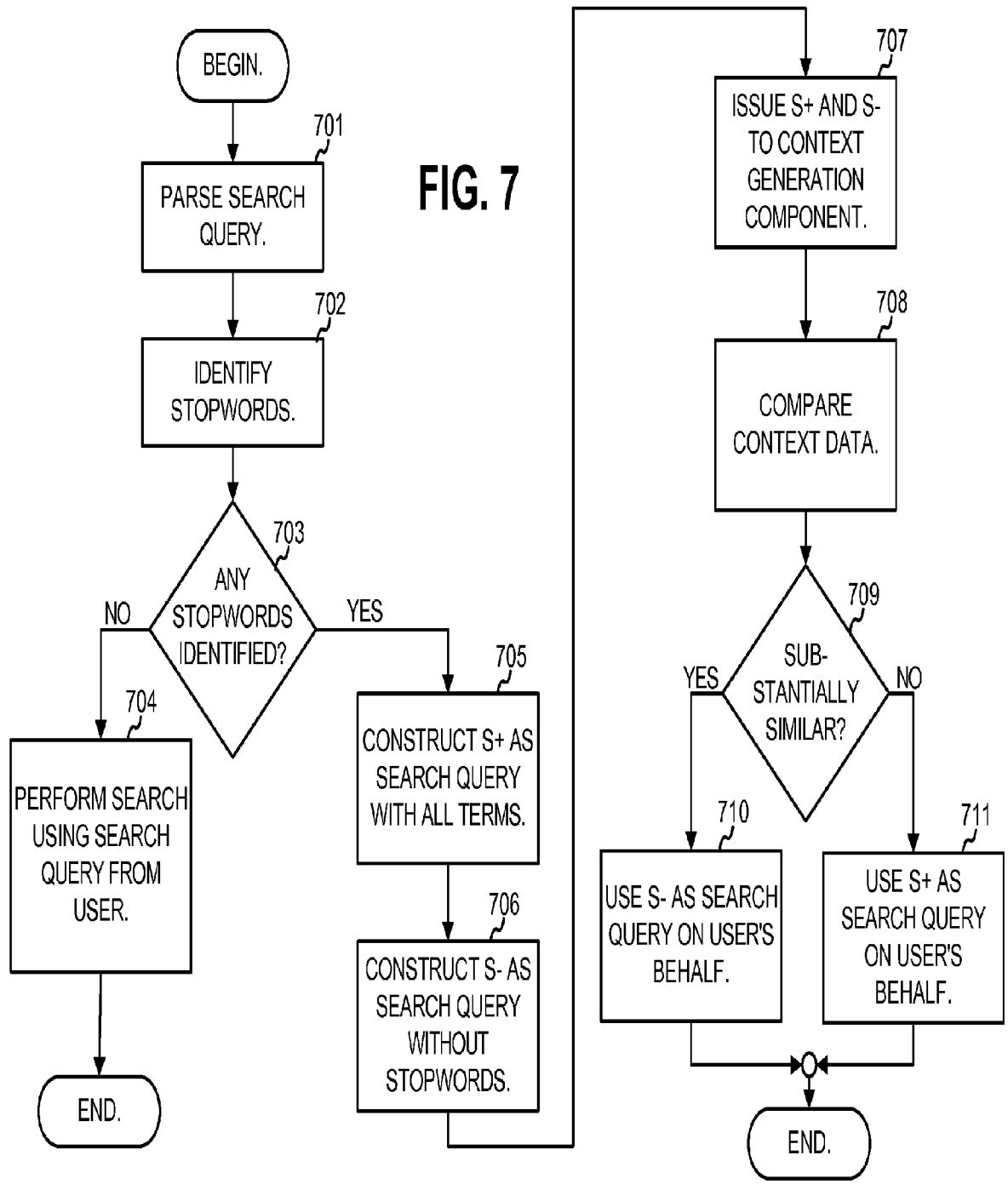
FIG. 7 is a flow chart illustrating operations consistent with aspects of the invention for performing searches based on a received search query.

FIG. 7 is a flow chart illustrating operations consistent with aspects of the invention for performing searches based on a received search query.

To begin, a search query is received and parsed (act 701). As described above, parser component 401 may parse the search query into a structure containing the individual terms from the search query. The terms in the search query may then be compared to stopword list 410 to identify stopwords (and stop-phrases) in the search query (act 702). If no stopwords are identified for the query, the original query may be used to generate search results for the user (acts 703 and 704).

If the original query is determined to contain stopwords, however, two versions of the query may be constructed. The first version, S+, can be the original search query, including stopwords (act 705). The second version, S−, can be the original search query minus the stopwords (act 706). In some implementations, stopwords in S− may be replaced with placeholders. Placeholders may be used to indicate the presence of a word without regard to the specific word. As an example of Acts 702-706, consider the search query "show me the way lyrics." Assume "show me" and "the" are identified in act 702 as stopwords. S+ would then be "show me the way lyrics." S− would then be "way lyrics" or, if placeholders are used, "* * * way lyrics" (where "*" represents the placeholder).

Context data for each of the search queries S+ and S− may then be identified (act 707). As described previously, the context data may be sets of documents generated for a search query or lists of categories relevant to the search query. The two sets of context data (i.e., one corresponding to S+ and one corresponding to S−) are compared (act 708). If the sets are substantially similar, the search query S− may be used as the search query (acts 709 and 710). Otherwise, the search query S+ may be used as the search query (acts 709 and 711).

Returning to the examplary initial search query "show me the way lyrics," the stopwords identified for this search query may be "show me" and "the" (act 702). Accordingly, S+ would be "show me the way lyrics" and S− could be "* * * way lyrics" (acts 705 and 706). Because S− is a less specific query than S+, it is likely to result in more context data and/or less specific context data. For example, when the context data includes sets of documents, the documents for S− may refer to songs that contain the term "way" in the title but are not titled "Show Me the Way," such as the songs "My Way" or "Walk this Way." Accordingly, the context data for S− and S+ are likely to be determined to be not substantially similar, (acts 709 and 711), and it would thus be desirable to use S+ as the final search query.

Figure 8:
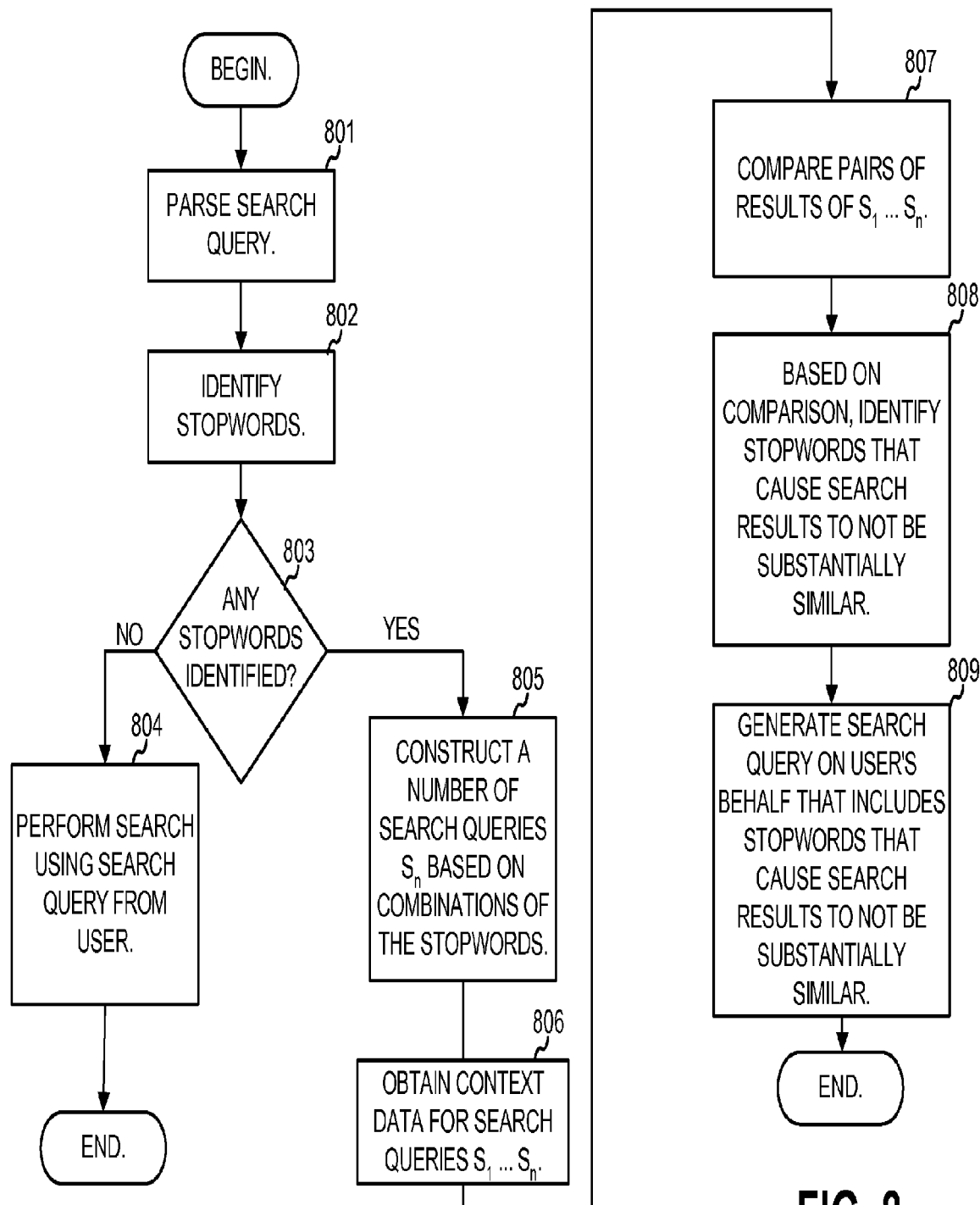
FIG. 8 is a flow chart illustrating operations consistent with another aspect of the invention for performing searches based on a received search query.

FIG. 8 is a flow chart illustrating operations consistent with another aspect of the invention for performing searches based on a received search query.

To begin, a search query is received and parsed (act 801). As described above, parser component 401 may parse the search query into a structure containing the individual terms from the search query. The terms in the search query may then be compared to stopword list 410 to identify stopwords (and stop-phrases) in the search query (act 802). If no stopwords are identified for the query, the original query may be used to generate search results for the user (acts 803 and 804).

If the original query is determined to contain stopwords, however, multiple versions of the query may be constructed (act 805). For example, n queries S may be generated. Each generated query may include the non-stopword portion of the original query plus combinations of the identified stopwords. For example, for the query "show me the way lyrics," four queries may be generated: "show me the way lyrics," "show me * way lyrics," "* * the way lyrics," and "* * * way lyrics".

Context data may then be generated for the search queries (act 806). The results may then be compared to determine whether pairs of the search queries include substantially similar context data results (act 807). Based on the comparison, stopwords can be identified that cause the search results to be not substantially similar to the results from the original search query (act 808). In other words, stopword detection component 225 may identify the stopwords that meaningfully contribute to the search results. These are stopwords that should be included in the final search query that is issued on behalf of the user. Accordingly, stopword detection component 225 may generate a search query on the user's behalf that includes the non-stopword terms in the search query plus any of the identified stopwords that meaningfully contribute to the search results (act 809).

As an example of Acts 808 and 809, consider the previously-mentioned query "show me the way lyrics". Stopword detection component 225 may consider the differences between the search results returned for "show me * way lyrics" and "show me the way lyrics." Assume that these two search results were substantially similar. Additionally, stopword detection component 225 may consider the differences between the search results returned for "* * the way lyrics" and "show me the way lyrics." Assume that the results for these two search queries were substantially different. Based on these results, stopword detection component 225 may conclude that the stop-phrase "show me" is a significant phrase in this search query and should be retained in the search query while "the" is not material to the search query and can be removed.

Modifications to the operations shown in FIGS. 7 and 8 are possible. For example, heuristics may be applied to determine whether the techniques shown in FIGS. 7 and 8 should be used. If not, an alternate stopword detection technique, such as simply identifying stopwords based on a predetermined list, may be used. For example, the techniques for finding stopwords shown in FIGS. 7 and 8 may only be applied when there are potential stopwords at the end of the search query. For example, because the query "how to write a will" contains the stopword "will" at the end of the query, the techniques of FIGS. 7 and 8 may be applied to this query.

Exemplary Implementation

Figure 9:
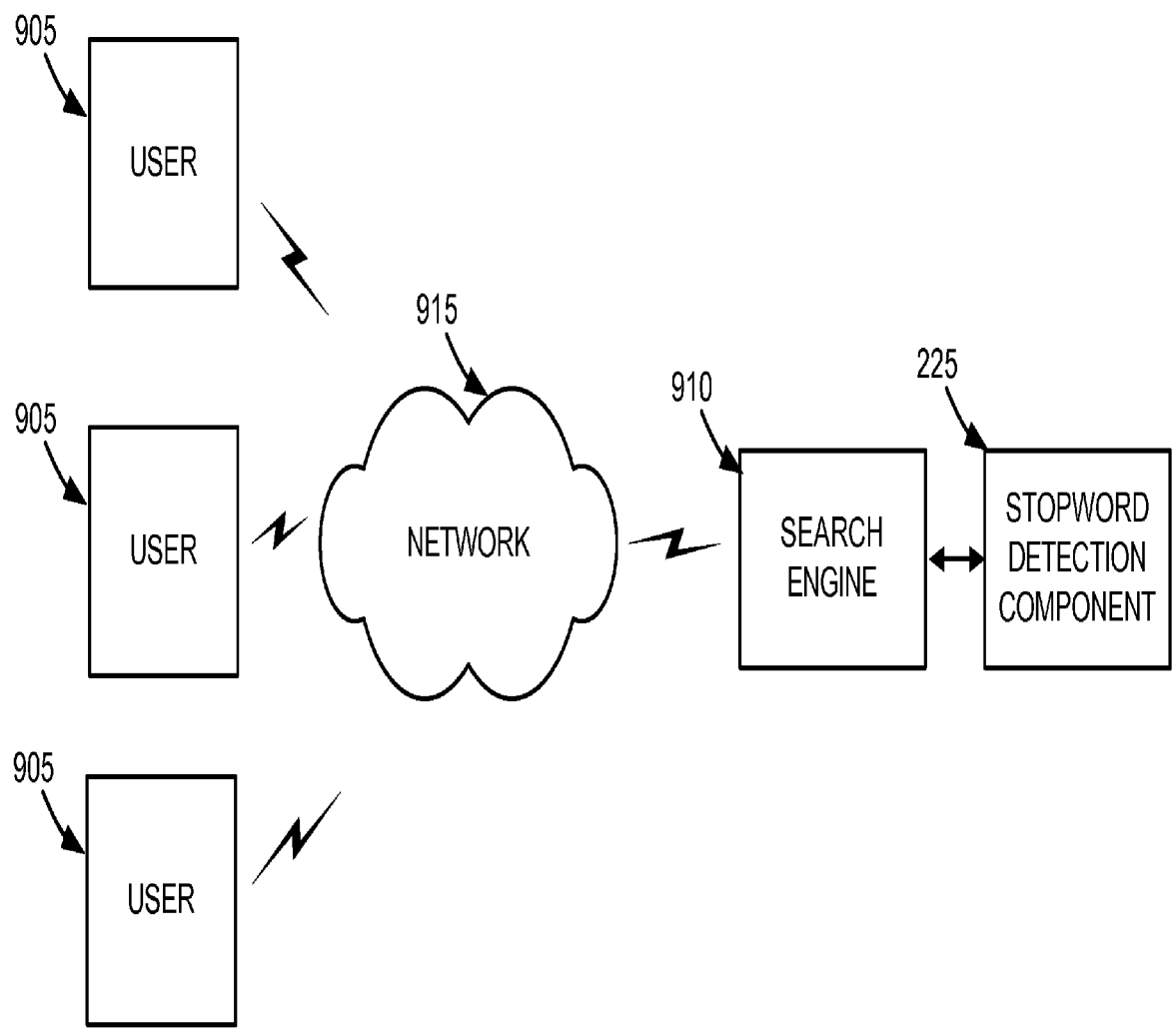
FIG. 9 is a diagram illustrating an exemplary implementation of a stopword detection component implemented in an Internet search engine.

FIG. 9 is a diagram illustrating an exemplary implementation of stopword detection component 225 implemented in an Internet search engine. A number of users 905 may connect to a search engine 910 over a network 915, such as the Internet. Search engine 910 may be a traditional search engine that returns a ranked set of documents related to a user query. Search engine 910 may be a general search engine, such as one based on all documents from a large collection, such as documents on the web, or a more specialized search engine, such as a news search engine. In other implementations, search engine 910 may be implemented over a specialized corpus of documents, such as a corporate document database made available over a corporate network 915.

In operation, search engine 910 may receive a user query. The search engine may submit the search query to stopword detection component 225 for initial processing. Stopword detection component 225, as described above, may then identify stopwords within the search query and/or rewrite the search query to remove stopwords that are determined to not contribute to the intended information requested by the user. Search engine 910 may generate a list of documents that contain the terms of the modified user search query. Search engine 910 may sort the documents in the list based on a number of factors, including ranking scores computed for each of the documents in the list. Search engine 910 may then return some or all of the sorted documents (or references to the sorted documents) to the user.

In an alternate implementation, search engine 910, in addition to returning search results based on the potentially modified version of the user search query, may also return an indication to the user that the search query was modified. Search engine 910 may additionally present the user with an option to resubmit the search query without using stopword detection component 225. This feature essentially gives the user an option to manually override stopword detection in search engine 910.

CONCLUSION

Techniques for detecting stopwords in a search query were described above. The techniques take into account context information derived from the input search query to more accurately determine whether a potential stopword should actually be considered a stopword in the context of the other terms in the search query.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   receiving, by one or more processors of one or more computer devices, a phrase that includes a stopword;
   identifying, by the one or more processors, first documents, from a corpus of documents, that are relevant to the phrase;
   forming, by the one or more processors and based on the phrase, a modified phrase that omits the stopword;
   identifying, by the one or more processors, second documents, from the corpus of documents, that are relevant to the modified phrase;
   comparing, by the one or more processors, information associated with the first documents and information associated with the second documents;
   determining, by the one or more processors and based on comparing the information associated with the first documents and the information associated with the second documents, whether the phrase and the modified phrase are associated with different concepts; and
   storing, by the one or more processors, the information identifying the phrase, with the stopword, when the phrase and the modified phrase are associated with different concepts.

2. The method of claim 1, further comprising:
   receiving a query that includes the phrase with the stopword; and
   selectively:
      performing, when the information identifying the phrase is stored, a search using the query with the stopword, or
      performing, when the information identifying the phrase is not stored, a search using the query without the stopword.

3. The method of claim 1, where comparing the information associated with the first documents and the information associated with the second documents includes:
  determining a quantity of documents that are included in both the first documents and the second documents; and
  where determining whether the phrase and the modified phrase are associated with different concepts includes:
    determining that the phrase and the modified phrase are not associated with different concepts when the quantity of documents, included in both the first documents and the second documents, satisfies a threshold value.

4. The method of claim 1, where comparing the information associated with the first documents and the information associated with the second documents includes:
  determining a first frequency corresponding to occurrences of a character string within the first documents, and
  determining a second frequency corresponding to occurrences of the character string within the second documents; and
  where determining whether the phrase and the modified phrase are associated with different concepts includes:
    determining that the phrase and the modified phrase are not associated with different concepts when the first frequency and the second frequency differ by less than a threshold value.

5. The method of claim 1, where comparing the information associated with the first documents and the information associated with the second documents includes:
  identifying first categories relevant to the first documents, and
  identifying second categories relevant to the second documents; and
  where determining whether the phrase and the modified phrase are associated with different concepts includes:
    determining that the phrase and the modified phrase are not associated with different concepts when a quantity of categories included in both the first categories and the second categories satisfies a threshold value.

6. The method of claim 1, where:
  the phrase includes a plurality of stopwords, and
  the modified phrase omits, as the stopword, one of the plurality of stopwords and includes at least one other stopword of the plurality of stopwords.

7. The method of claim 1, where the stopword includes a plurality of words.

8. A system comprising:
  one or more devices to:
    receive a phrase that includes a stopword,
    identify first documents, from a corpus of documents, that are relevant to the phrase,
    form a modified phrase that omits the stopword,
    identify second documents, from the corpus of documents, that are relevant to the modified phrase,
    compare information associated with the first documents and information associated with the second documents,
    determine, based on comparing the information associated with the first documents and the information associated with the second documents, whether the phrase and the modified phrase are associated with different concepts, and
    store information identifying the phrase, with the stopword, when the phrase and the modified phrase are associated with different concepts.

9. The system of claim 8, where the one or more devices are further to:
  receive a query that includes the phrase with the stopword, and
  selectively:
    perform, when the information identifying the phrase is stored, a search using the query with the stopword, or
    perform, when the information identifying the phrase is not stored, the search using the query without the stopword.

10. The system of claim 8, where the one or more devices, when comparing the information associated with the first documents and the information associated with the second documents, are further to:
  determine a quantity of documents that are included in both the first documents and the second documents, and
  where the one or more devices, when determining whether the phrase and the modified phrase are associated with different concepts, are further to:
    determine that the phrase and the modified phrase are not associated with different concepts when the quantity of documents, included in both the first documents and the second documents, satisfies a threshold value.

11. The system of claim 8, where the one or more devices, when comparing the information associated with the first documents and the information associated with the second documents, are further to:
  determine a first frequency corresponding to occurrences of a character string within the first documents, and
  determine a second frequency corresponding to occurrences of the character string within the second documents, and
  where the one or more devices, when determining whether the phrase and the modified phrase are associated with different concepts, are further to:
    determine that the phrase and the modified phrase are not associated with different concepts when the first frequency and the second frequency differ by less than a threshold value.

12. The system of claim 8, where the one or more devices, when comparing the information associated with the first documents and the information associated with the second documents, are further to:
  identify first categories relevant to the first documents, and
  identify second categories relevant to the second documents, and
  where the one or more devices, when determining whether the phrase and the modified phrase are associated with different concepts, are further to:
    determine that the phrase and the modified phrase are not associated with different concepts when a quantity of categories included in both the first categories and the second categories satisfies a threshold value.

13. The system of claim 8, where:
  the phrase includes a plurality of stopwords, and
  the modified phrase omits, as the stopword, one of the plurality of stopwords and includes at least one other stopword of the plurality of stopwords.

14. The system of claim 8, where the stopword includes a plurality of words.

15. A memory device to store instructions, the instructions comprising:
  one or more instructions that, when executed by one or more processors, cause the one or more processors to:
    receive a phrase that includes a stopword, identify first documents, from a corpus of documents, that are relevant to the phrase, form a modified phrase that omits the stopword, identify second documents, from the corpus of documents, that are relevant to the modified phrase, compare information associated with the first documents and information associated with the second documents, determine, based on comparing the information associated with the first documents and the information associated with the second documents, whether the phrase and the modified phrase are associated with different concepts, and store information identifying the phrase, with the stopword, when the phrase and the modified phrase are associated with different concepts.

16. The memory device of claim 15, where the instructions further comprise:

one or more instructions to:

receive a query that includes the phrase with the stopword, and selectively:

perform, when the information identifying the phrase is stored, a search using the query with the stopword, or perform, when the information identifying the phrase is not stored, the search using the query without the stopword.

17. The memory device of claim 15, where the one or more instructions to compare the information associated with the first documents and the information associated with the second documents further include:

one or more instructions to:

determine a quantity of documents that are included in both the first documents and the second documents, and where the one or more instructions to determine whether the phrase and the modified phrase are associated with different concepts further include:

one or more instructions to:

determine that the phrase and the modified phrase are not associated with different concepts when the quantity of documents, included in both the first documents and the second documents, satisfies a threshold value.

18. The memory device of claim 15, where the one or more instructions to compare the information associated with the first documents and the information associated with the second documents further include:

one or more instructions to:

determine a first frequency corresponding to occurrences of a character string within the first documents, and determine a second frequency corresponding to occurrences of the character string within the second documents, and where the one or more instructions to determine whether the phrase and the modified phrase are associated with different concepts further include:

one or more instructions to:

determine that the phrase and the modified phrase are not associated with different concepts when the first frequency and the second frequency differ by less than a threshold value.

19. The memory device of claim 15, where the one or more instructions to compare the information associated with the first documents and the information associated with the second documents further include:

one or more instructions to:

identify first categories relevant to the first documents, and identify second categories relevant to the second documents, and where the one or more instructions to determine whether the phrase and the modified phrase are associated with different concepts further include:

one or more instructions to:

determine that the phrase and the modified phrase are not associated with different concepts when a quantity of categories included in both the first categories and the second categories satisfies a threshold value.

20. The memory device of claim 15, where:

the phrase includes a plurality of stopwords, and the modified phrase omits, as the stopword, one of the plurality of stopwords and includes at least one other stopword of the plurality of stopwords.

\* \* \* \* \*